United States Patent
Callender et al.

(10) Patent No.: US 7,647,496 B2
(45) Date of Patent: *Jan. 12, 2010

(54) PROCESS-MODE INDEPENDENT DRIVER MODEL

(75) Inventors: Robin L. Callender, Redmond, WA (US); Narayanan Ganapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

This patent is subject to a terminal disclaimer.

(21) Appl. No.: 11/340,345

(22) Filed: Jan. 26, 2006

(65) Prior Publication Data

US 2006/0123148 A1    Jun. 8, 2006

Related U.S. Application Data

(63) Continuation of application No. 10/185,122, filed on Jun. 26, 2002, now Pat. No. 7,024,672.

(51) Int. Cl.
*H04L 9/00* (2006.01)
*H04L 9/32* (2006.01)

(52) U.S. Cl. .................................. 713/164; 726/2
(58) Field of Classification Search ............ 713/1, 713/190, 164; 726/1–2, 16–22, 26–27; 719/321, 719/310, 313
See application file for complete search history.

(56) References Cited

U.S. PATENT DOCUMENTS 6,131,163 A * 10/2000 Wiegel .................. 726/12
6,134,567 A    10/2000 Nakkiran et al.
6,199,181 B1 *  3/2001 Rechef et al. ............ 714/38
7,024,672 B2 *  4/2006 Callender et al. ......... 719/321

FOREIGN PATENT DOCUMENTS

EP    0871114 A2    6/1997
EP    0871115 A2   10/1998

OTHER PUBLICATIONS

Armand, Francois. "Give a Process to your Drivers!", Chorus Systemes, 1991. Retrieved from the Internet: URL: http://www.teaser.fr/{pleonard/publications/chorus/CS-TR-91-97.pdf>.

* cited by examiner

*Primary Examiner*—Hosuk Song
(74) *Attorney, Agent, or Firm*—Workman Nydegger

(57) ABSTRACT

Methods, systems, and computer program products that, by defining a common interface, allow for a single implementation of operations common to both kernel mode and user mode processing, relative to a hardware adapter. Corresponding kernel mode and user mode implementations of the operations are provided. For a given process, a call to the common interface is mapped to the kernel mode implementation for kernel mode processes and to the user mode implementation for user mode processes. The mapping may be performed at runtime or may be static. The common operation may provide a user mode process direct access to a hardware adapter, such as for sending and receiving information, without switching to kernel mode. A kernel mode implementation for operations unique to kernel mode processing, such as specifying security parameters for the hardware adapter to enforce, or initiating and terminating communication through the hardware adapter, also may be provided.

20 Claims, 6 Drawing Sheets

PROCESS-MODE INDEPENDENT DRIVER MODEL

CROSS-REFERENCE TO RELATED APPLICATIONS

This application is a continuation of U.S. patent application Ser. No. 10/185,122, filed Jun. 26, 2002, and entitled "PROCESS-MODE INDEPENDENT DRIVER MODEL", and which is incorporated herein by reference.

BACKGROUND OF THE INVENTION

1. The Field of the Invention

The present invention relates to the field of driver software for computer hardware. Specifically, the present invention relates to methods, systems, and computer program products that allow for a single implementation of one or more operations that are common to both kernel mode processing and user mode processing relative to the hardware adapter.

2. Background and Related Art

With the increasing performance of computer hardware, the operation of computer software is becoming a more significant factor in overall system performance. Efficient computer software for interacting with hardware adapters that communicate with hardware devices is particularly important given the frequency and amount of information that tends to be exchanged. One typical communication bottleneck relates to various software layers and the corresponding transitions between process modes that often occur between an application and a hardware adapter.

Many operating systems provide at least two process modes: (i) a relatively less trusted and therefore more restricted user mode, and (ii) a relatively more trusted and therefore less restricted kernel mode. Generally, application processes run within user mode so that the processes are isolated and cannot interfere with each other's resources. User processes switch to kernel mode when making system calls, generating an exception or fault, when an interrupt occurs, etc. Processes running in kernel mode are privileged and have access to all computer resources (such as all available memory), without the restrictions that apply to user mode processes. Because the operating system kernel acts as a gatekeeper to computer resources, direct access to resources is generally limited to kernel mode processes. Distinctions between user mode processes and kernel mode processes also may be supported by computer hardware. For example, many microprocessors have processing modes to support the distinctions between user mode processes and kernel mode processes.

Because access to certain resources is limited to kernel mode processes, a user mode process must transition or switch to a kernel mode process to gain access. Following access, the process switches back to user mode for further execution. Switching process modes, however, can have a significant impact of performance. Therefore, in an effort to alleviate the performance degradation associated with switching process modes, some hardware adapters support enforcement of security measures within certain parameters so that user mode applications may access the hardware directly, without having to transition to kernel mode. Accordingly, some software drivers bypass kernel mode for certain operations.

Despite allowing user mode processes direct access to hardware resources, the overall security of the computer system remains in tact by limiting access within specified security parameters. For the hardware adapter, these security parameters are set using kernel mode processes. Essentially, the security parameters indicate that a particular process is allowed direct access for certain operations. The hardware adapter will reject similar access attempts by other processes, and will reject access attempts by a process that are beyond the scope of permission granted by the security parameters.

Certain operations may be implemented for both user mode and kernel mode. Implementing the same operation in each mode, however, introduces inefficiencies in the software development process. Consider, for example, a memory allocation. Although in each case a region of memory is allocated, memory allocations in kernel mode have different requirements than memory allocations in user mode. For example, a kernel mode memory allocation may guarantee certain alignment conditions to facilitate hardware interaction, whereas alignment conditions may be irrelevant for a user mode memory allocation. Yet, from the perspective of a hardware driver, all that is needed is a region of memory. As a result, a single operation for accessing a hardware adapter typically has separate user mode and kernel mode implementations. Accordingly, methods, systems, and computer program products that allow for a single implementation of operations that are common to both kernel mode processing and user mode processing, relative to the hardware adapter, are desired.

BRIEF SUMMARY OF THE INVENTION

The present invention relates to methods, systems, and computer program products that allow for a single implementation of operations that are common to both kernel mode processing and user mode processing, relative to a hardware adapter. For at least one operation that is common to user mode processing and kernel mode processing, a common interface is defined. Corresponding kernel mode and user mode implementations of the at least one operation are provided. For a given process, a call to the interface is mapped to the kernel mode implementation if the given process is a kernel mode process and to a user mode implementation if the given process is a user mode process. The mapping may be performed at runtime or may be static.

The common operation may provide a user mode process direct access to a hardware adapter without switching to kernel mode. A kernel mode implementation for one or more operations that are unique to kernel mode process also may be provided. For example, operations for initiating and terminating communication through the hardware adapter may be unique to kernel mode processing, whereas operations for sending and receiving information through the adapter may be common to both user mode processing and kernel mode processing. Specifically, one of the operations unique to kernel mode processing may identify security parameters for the hardware adapter to enforce.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention relates to methods, systems, and computer program products that allow for a single implementation of an operation that is common to both kernel mode processing and user mode processing, relative to a hardware adapter. A common interface to the kernel mode and the user mode implementations of the operation is provided. If the calling process is a user mode process, the call is mapped to the user mode implementation and if the calling process is a kernel mode process, the call is mapped to the kernel mode implementation. Some embodiments of the present invention may comprise one or more special purpose and/or one or more general purpose computers including various computer hardware, as discussed in greater detail below with respect to FIG. 4.

Figure 1:
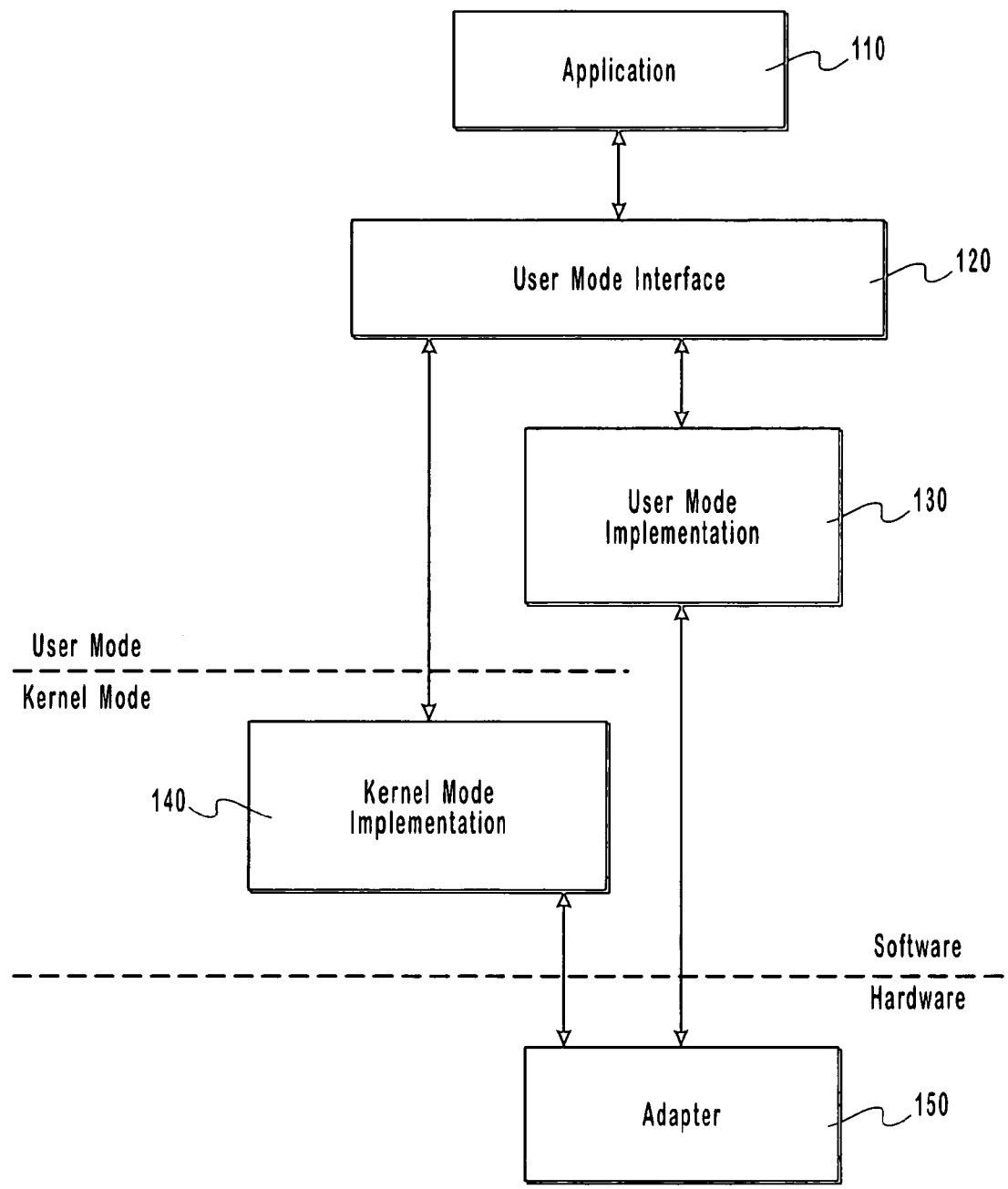
FIG. 1 shows a high-level block diagram of a hardware driver model that allows for a single implementation of common user mode and kernel mode operations in accordance with the present invention.

FIG. 1 shows a high-level block diagram of a hardware driver model that allows for a single implementation of common user mode and kernel mode operations in accordance with the present invention. An application 110 accesses adapter 150 through user mode interface 120. Some operations are mapped to kernel mode implementation 140, whereas others are mapped to user mode implementation 130. Note that user mode implementation 130 provides direct access to adapter 150, without switching to kernel mode. Accordingly, application 110 is able to access adapter 150 through user mode implementation 130 in significantly less time than would be required for kernel mode implementation 140.

Having corresponding operations implemented in both user mode implementation 130 and kernel mode implementation 140 is desirable for at least a couple of reasons. First, kernel mode implementation 130 generally includes all operations possible for adapter 150 so that applications without user mode interface 120 are able to interact with adapter 150. Given the overhead of switching from kernel mode to user mode (and switching back again), kernel mode implementation 140 calling user mode implementation 130 (for operations that can be implemented in user mode) typically would result in less than optimal performance, especially so since user mode implementation 130 implements operations that tend to occur frequently, such as sending and receiving information. (Note also, that for an application to reach kernel mode implementation 140, one switch from user mode to kernel mode has already taken place, and another will follow in switching back from kernel mode to user mode.)

Second, kernel mode implementation 140 generally includes operations that are unique to kernel mode. Often these operations make use of more basic operations for sending and receiving information from adapter 150. However, as indicated above, frequent operations like sending and receiving information are likely candidates to be included in user mode implementation 130 in order to achieve the performance benefits of avoiding a process transition from user mode to kernel mode. Similar to the situation described above, the overhead of switching from kernel mode to user mode in accessing user mode implementation 130 and switch back to kernel mode results in non-optimal performance.

Because of differences in user mode processing and kernel mode processing, user mode implementations of a given operation tend to differ from kernel mode implementations. Traditionally, each user mode implementation 130 of an operation provides the same functionality as a corresponding kernel mode implementation 140 of the operation, but suitable for user mode processing. In accordance with the present invention, however, and as described in more detail with respect to the example hardware driver model illustrated in FIGS. 2A-2C, user mode implementation 130 and kernel mode implementation 140 share a common interface. (In FIG. 1, this common interface is part of user mode implementation 130 and kernel mode implementation 140 and is not shown separately.) Accordingly, the same source code may be written for a kernel mode communication operation and a user mode communication operation. Using the same source code (e.g., a static library derived from a common source) is a significant benefit that reduces development time, testing time, and programming errors because less program code needs to be written and tested. The common interface also may provide a developer with meaningful guidance on how software should be designed, based on the routines available through the common interface.

Of course, some operations are unique to kernel mode implementation 140. For example, because the kernel is responsible for enforcing security, initiating and terminating access to adapter 150 occurs through kernel mode implementation 140. Once kernel mode implementation 140 (under the direction of application 110) provides the appropriate security parameters to adapter 150, adapter 150 performs the corresponding security checks when it is accessed, such as verifying that the accessing process has been properly authorized through kernel mode implementation 140.

Figure 2A:
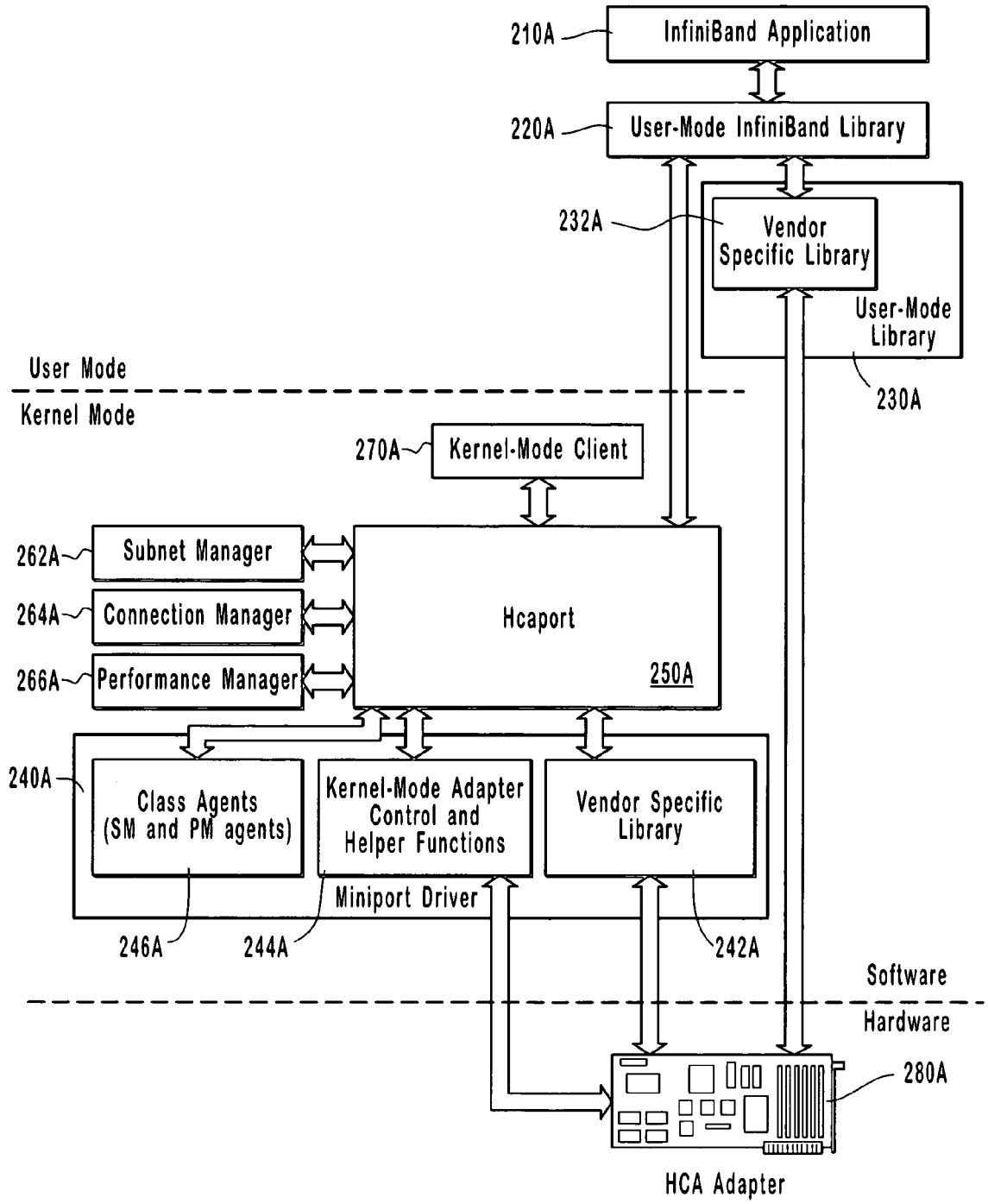
FIGS. 2A-2C illustrate an example hardware driver model in accordance with the present invention.
Figure 2B:
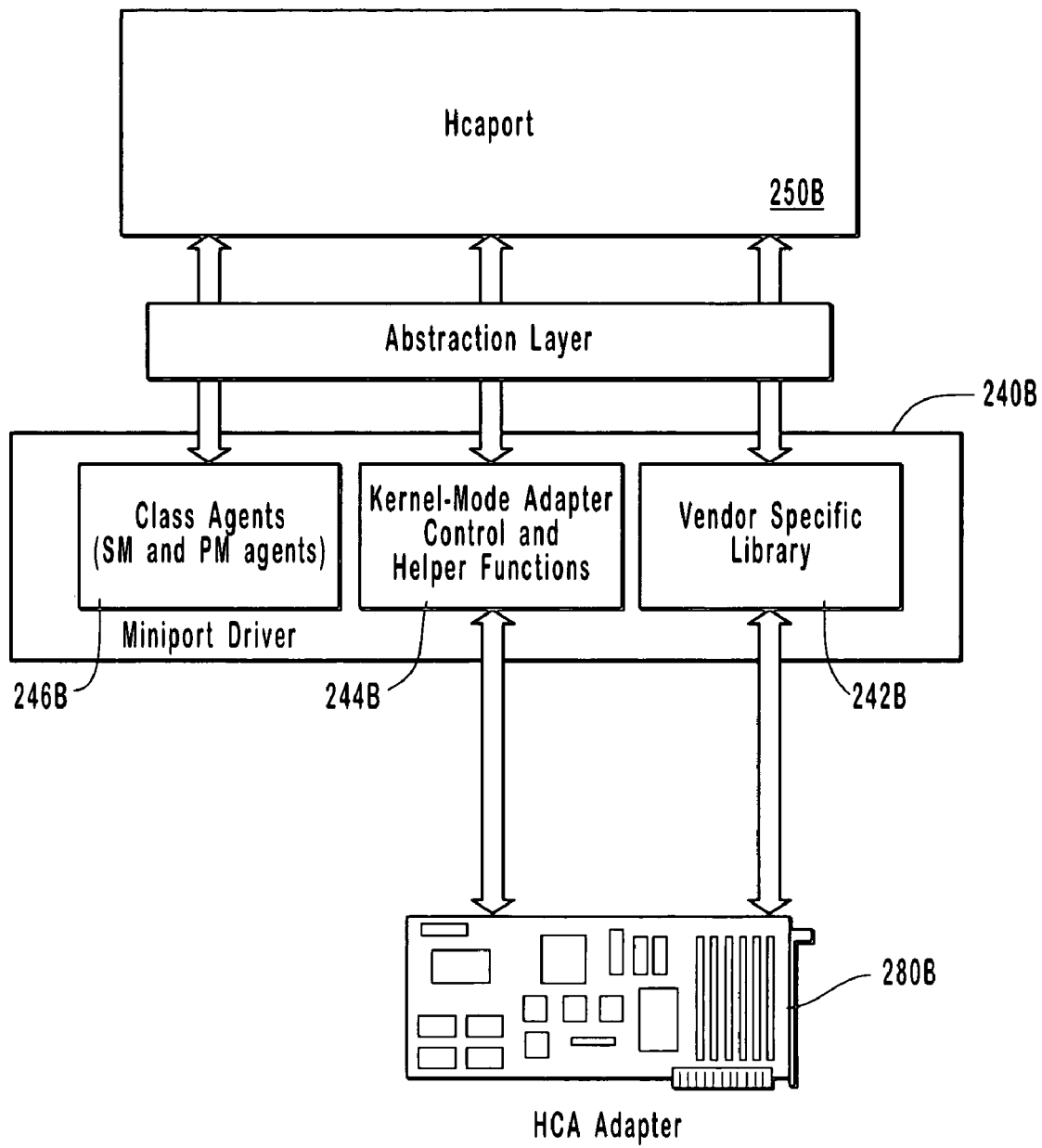
Figure 2C:
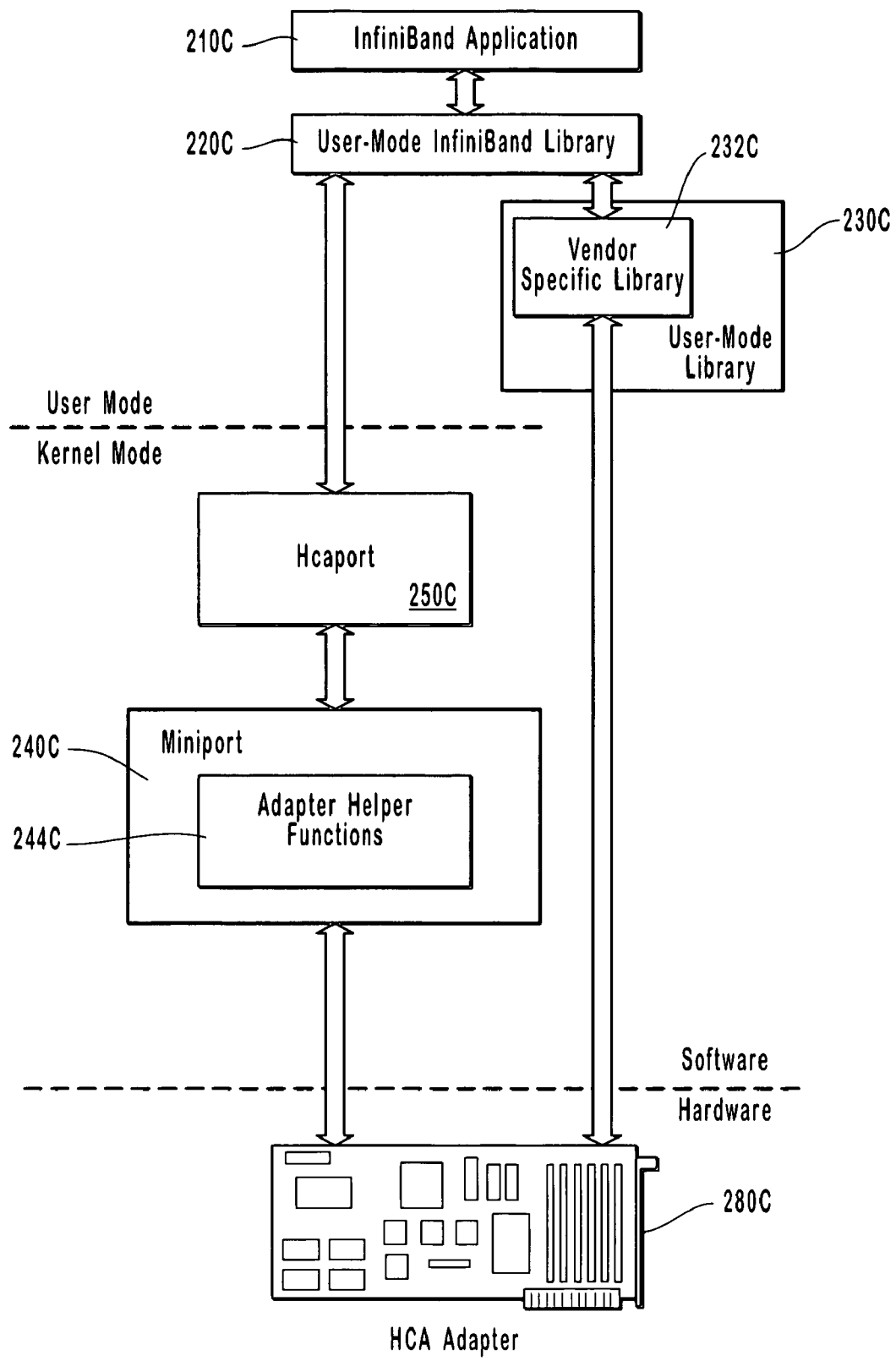

FIGS. 2A-2C illustrate an example hardware driver model that allows for a single implementation of common user mode and kernel mode operations in accordance with the present invention. InfiniBand application 210A accesses host channel adapter ("HCA adapter") 280A through user mode library 230A and through kernel mode miniport driver 240A. Certain access to HCA adapter 280A through user mode library 230A (as opposed to kernel mode miniport driver 240A) is practical because InfiniBand represents one example of a hardware architecture that offloads certain security checking and other processing to the adapter. Initiating and terminating access are controlled through kernel mode operations to assure an appropriate level of security. After initiation, however, security for frequent communication operations, such as those related to sending and receiving data, is enforced at the HCA hardware, allowing for extremely fast user mode access. For example, as described in more detail below with respect to FIG. 2C, kernel mode miniport driver 240A is responsible for creating and destroying communication queues, whereas user mode library 230A permits user mode data transfer to the communication queues at HCA adapter 280A.

InfiniBand application 210A first calls user mode InfiniBand library 220A which knows about user mode library 230A via specified configuration information held in a registry database. In one sense, user mode library 230 may be thought of as an extension of user mode InfiniBand library 220A. The user mode library 230A exports a well-know application program interface ("API") (in the form of a dispatch table) for the routines it supports. In one embodiment, user mode library 230A is implemented as a dynamic link library ("DLL"). Although not necessarily required, much of the benefits of InfiniBand are realized through the kernel-bypass IO features offered by the user mode library 230A.

InfiniBand library 220A presents an abstracted general HCA device interface. The vendor specific library 232A of user mode library 230A maps the abstraction of InfiniBand library 220A to the hardware-specific operations of HCA adapter 280A. The same vendor specific library appears as vendor specific library 242A of miniport driver 240A, as described in more detail below. Accordingly, vendor specific library 232A and vendor specific library 242A represent, at least in part, a process mode independent ("PMI") HCA IO access library.

User mode InfiniBand library 220A also accesses HCA adapter 280A through Hcaport 250A and miniport driver 240A. In addition to vendor specific library 242A, miniport driver 240A also includes kernel mode adapter control and helper functions 244A and class agents 246A. Additional details regarding the relationship between Hcaport 250A, miniport driver 240A, and HCA adapter 280A is provided below, in connection with FIG. 2B. Hcaport 250A also permits access to HCA Adapter 280A from other kernel mode client 270A (e.g., an RNDIS miniport that uses an Hcaport client API). The Hcaport 250A starts various class management subsystems, including the subnet manager 262A, the connection manager 264A, and the performance manager 266A.

Turning next to FIG. 2B, Hcaport 250B provides an abstracted general HCA device interface. Similar to user mode library 230A and vendor specific library 232A, miniport driver 240B and vendor specific library 242B map the abstraction of Hcaport 250B to hardware specific operations of the HCA adapter 280B. As indicated above, the same vendor specific PMI library appears as vendor specific library 242B of miniport driver 240B and vendor specific library 232A of user mode library 230A. (Kernel specific routines are implemented in kernel mode adapter control and helper functions 244B.) In addition, Hcaport 250B prepares an environment for the miniport driver's class agents 246B.

Hcaport 250B establishes an operating environment that provides miniport 240B with operating system functionality, such as memory allocation, registry access, and port/register access. Direct calls to the operating system may not be permitted in an effort to shield miniport developers from certain design complexities and thereby facilitate the goal of a single source for vendor specific library 232A and vendor specific library 242B. Hcaport 250B also serializes miniport driver 240B requests so that the miniport developer need not address serialization issues. Memory resources are allocated from the operating system's non-paged memory pool.

It is worth noting that Hcaport 250B provides for the management of InfiniBand resources to InfiniBand clients. In contrast, miniport driver 240B does not provide InfiniBand resource management, but rather acts as an extension of the Hcaport's management methods. Miniport driver 240B shields Hcaport 250B from the vendor specific operating semantics of the HCA adapter 280B. A miniport information structure provides Hcaport 250B with the miniport control/helper and PMI IO access callback routines.

FIG. 2C shows InfiniBand Application 210C accessing HCA adapter 280C through user mode InfiniBand library 220C and either user mode library 230C with vendor specific library 232C or Hcaport 250C and miniport 240C with adapter helper functions 244C. The adapter control and helper functions address two requirements. The first is general control and operation of HCA adapter 280C in the typical driver sense, such as starting and stopping the miniport driver, IO bus resource assignment and management (IO, memory and interrupts), processing of plug-and-play commands, and processing power management commands.

The second requirement relates to support of kernel mode helper functions. These are privileged functions executed by the miniport to provide orderly communication resource management, including: (i) protection domain management, such as the creation and destruction of protection domains and the assignment of protection domains as needed; (ii) translation and protection table management, such as the creation and destruction of the translation and protection table and table entry control and manipulation, including the creation and destruction of memory regions and memory windows; (iii) event request management, such as the creation and destruction of the event queue and the processing of events from the event queue; (iv) completion queue management, such as the creation and destruction of completion queues and binding and unbinding of a completion queue with the HCA adapter; (v) work queue management, such a the creation and destruction of a work queue, support for programming work queue attributes, and the binding of work queues with the HCA adapter; (vi) address vector table management, such as the creation and destruction of address vector tables (in some cases this may be part of the protection domain management functionality); and (vii) multicast support, such as the creation and destruction of multicast groups.

The process mode independent library (e.g., vendor specific library 232C and vendor specific library 242B) are statically linked into both miniport 240C and user mode library 230C. As noted above, by making the library a common component, the development, maintenance, and testing of an HCA miniport may be reduced. Generally, the PMI library's functions have one or more context specific extension areas passed to them. The extensions are PMI work areas, used by the PMI function to establish the processing context. Based on the processing context, the corresponding user mode or kernel mode implementations are called or mapped for a commonly named function.

The PMI vendor specific library provides three general types of functionality: (i) the user mode side of protection domain/completion queue/work queue ("PD/CQ/WQ") creation and destruction, (ii) posting IO requests to the queue pair registers allocated to the user mode process, and (iii) memory window manipulation via a bind request. The PMI routines for PD/CQ/WQ creation and destruction support operate in a two step process. The first step acquires needed resources for allocation of a queue pair by the miniport in kernel mode. The second step checks the results and if a request fails, frees resources allocated to the process. IO requests directly manipulate an allocated queue pair. Little architecture is imposed on IO requests and memory window manipulation because high bandwidth and low latency tend to be significant factors.

Figure 3:
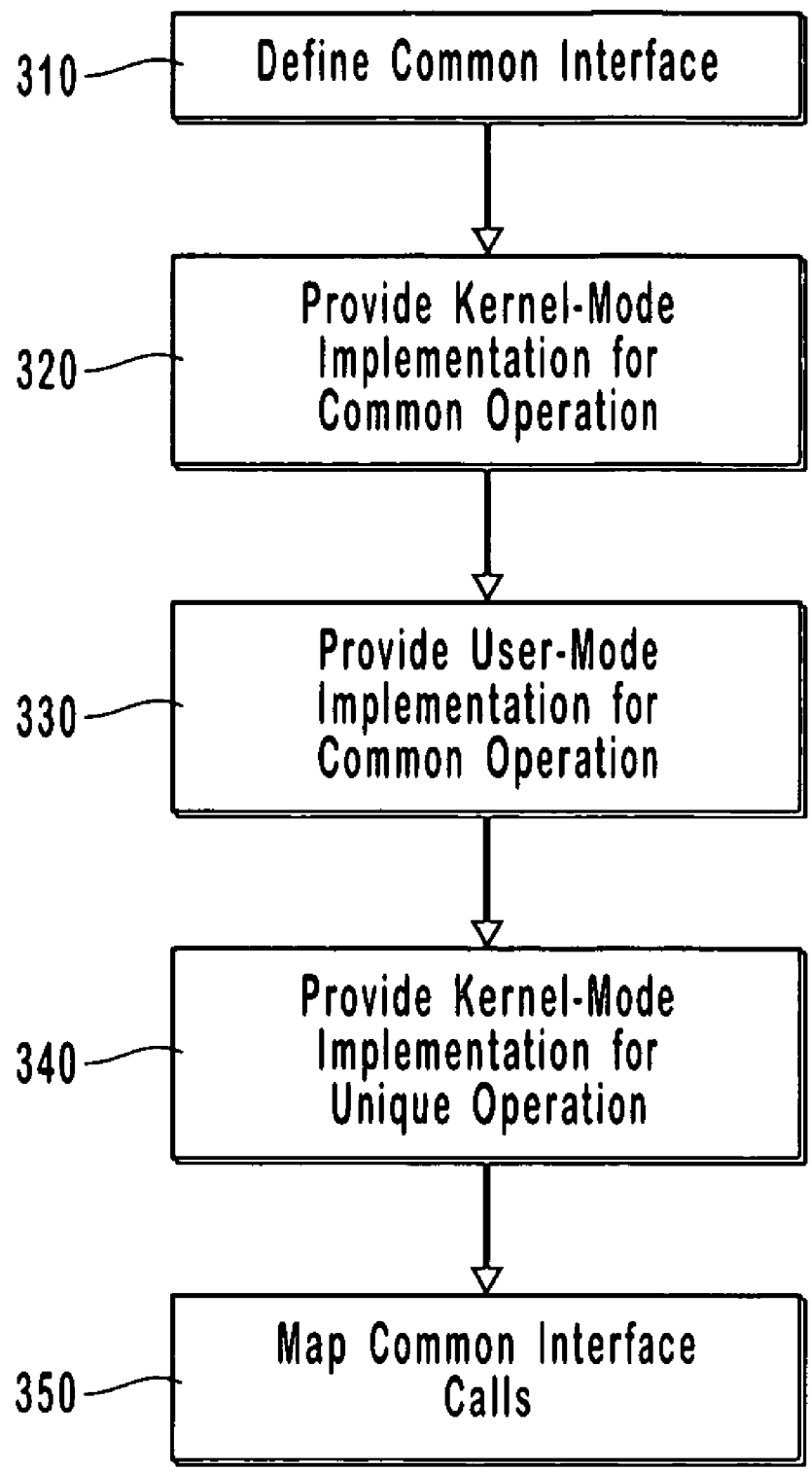
FIG. 3 shows example acts for methods that allow for a single implementation of common user mode and kernel mode operations in accordance with the present invention.

FIG. 3 shows example acts for methods that allow for a single implementation of common user mode and kernel mode operations in accordance with the present invention.

Although these acts may be described or claimed in a particular order, the present invention is not necessarily limited to any particular ordering or combination of acts. Allowing for a single implementation of one or more operations that are common to both kernel mode processing and user mode processing relative to a hardware adapter may include an act of defining (310) a common interface for at least one operation that is common to kernel mode processing and user mode processing; an act of providing (320) a kernel mode implementation of the at least one operation that corresponds to the name; an act of providing (330) a user mode implementation of the at least one operation that corresponds to the name; providing (340) a kernel mode implementation of one or more operations that are unique to kernel mode processing; and mapping (350) one or more common interface calls to the kernel mode implementation if a given process is a kernel mode process and to the user mode implementation if the given process is a user mode process.

The embodiments of the present invention may comprise one or more special purpose and/or one or more general purpose computers including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise storage media such as RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
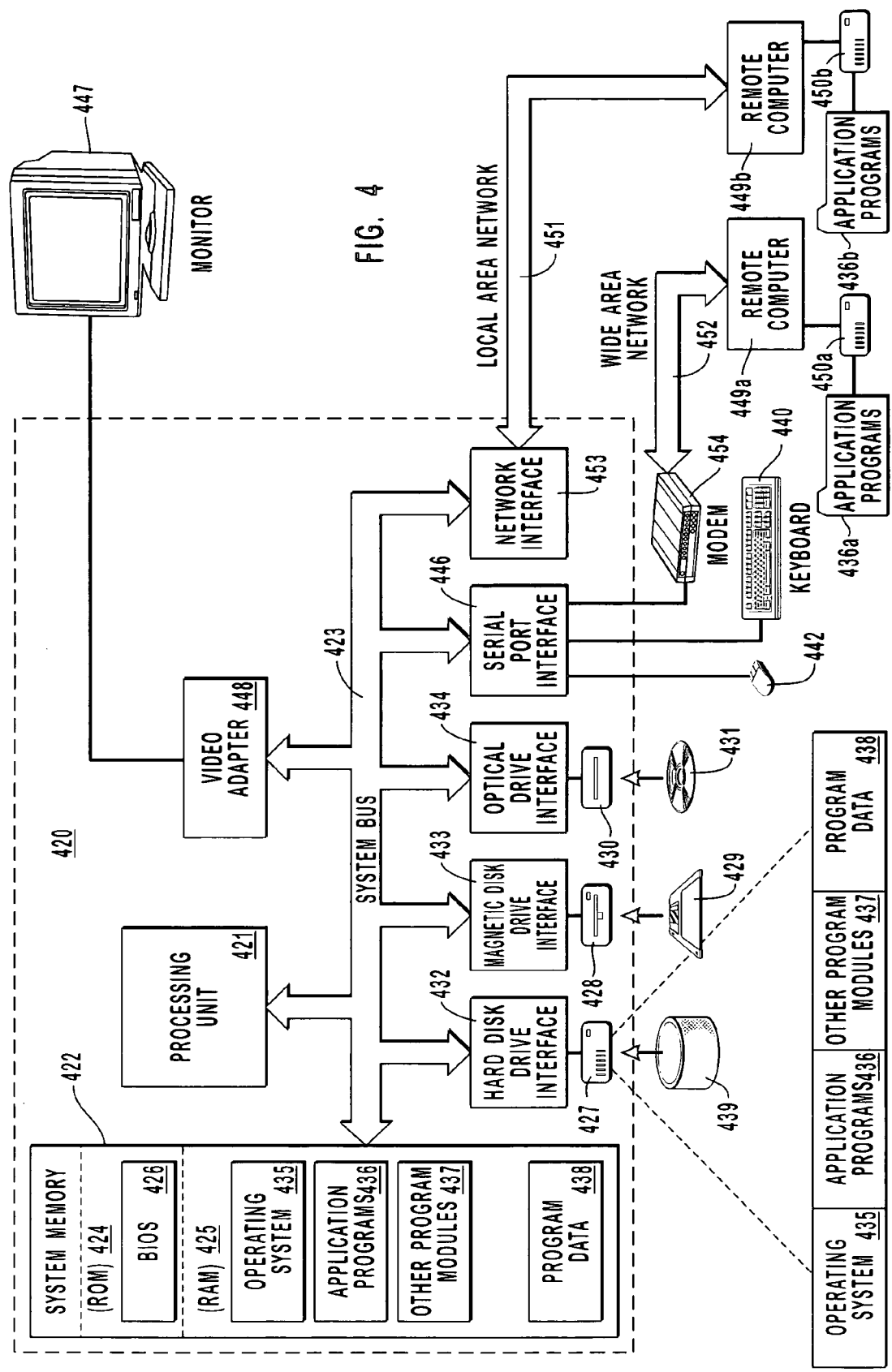
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   a processor; and
   one or more storage media storing executable instructions that implement processes capable of operating in at least one of (i) a relatively less restricted kernel mode, and (ii) a relatively more restricted user mode, and a hardware adaptor through which the one or more processes communicate with at least one hardware device over a communication link, the one or more computer-readable storage media further comprising computer-executable instructions for implementing a method that provides a single implementation of one or more operations that are common to both kernel mode processing and user mode processing relative to the hardware adapter, wherein the method comprises acts of:
   defining a common interface name for at least one operation corresponding to the hardware adaptor and that is common to both kernel mode processing and user mode processing;
   providing a kernel mode implementation of the at least one operation that corresponds to the name;
   providing a user mode implementation of the at least one operation that corresponds to the name, wherein the kernel mode implementation includes more operations than the corresponding user mode implementation, including both operations that are common between the user mode and kernel mode as well as unique operations; and
   for a given process, mapping one or more common interface calls (i) to the kernel mode implementation if the given process is a kernel mode process, and (ii) to the user mode implementation if the given process is a user mode process.

2. The computing system as recited in claim 1, wherein the at least one operation corresponds to a communication operation that provides a user mode process direct access to the hardware adapter, without switching to kernel mode and wherein the method further comprises an act of providing a kernel mode implementation of one or more operations that are unique to kernel mode processing.

3. The computing system as recited in claim 1, wherein the mapping occurs at runtime.

4. The computing system as recited in claim 1, wherein the mapping is static.

5. The computing system as recited in claim 1, wherein the kernel mode implementation and the user mode implementation of a given operation are different even though functionality provided by implementing the kernel mode implementation of the given operation is the same as functionality provided by implementing the user mode implementation of the given operation.

6. A method for providing a single implementation of one or more operations which are common to both kernel mode processing and user mode processing relative to a hardware communication adapter, the method comprising:
   utilizing an interface module to identify a common name and parameter list for one or more operations that are common to kernel mode processing and user mode processing;
   utilizing a kernel mode implementation module to implement the one or more operations for execution in kernel mode;
   utilizing a user mode implementation module to implement the one or more operations for execution in user mode, wherein the kernel mode implementation module is configured to implement more operations than the corresponding user mode implementation module, including both operations that are common between the user mode and kernel mode as well as unique operations; and
   utilizing a dispatch module to invoke the kernel mode implementation module if a calling process is a kernel mode process and invoke the user mode implementation module if the calling process is a user mode process.

7. The method as recited in claim 6, wherein the user mode implementation module provides direct access to the hardware communication adapter, without switching to kernel mode.

8. The method as recited in claim 6, further comprising: utilizing a kernel-mode-only implementation module to implement one or more operations unique to kernel mode processing.

9. The method as recited in claim 8, wherein at least one of the one or more operations unique to kernel mode processing provide security parameters for the hardware communication adapter to enforce.

10. The method as recited in claim 8, wherein the one or more operations that are unique to kernel mode processing comprise one or more privileged operations and wherein the one or more operations that are common to kernel mode processing and user mode processing correspond to one or more non-privileged operations.

11. The method as recited in claim 10, wherein the one or more privileged operations are used in initiating and terminating conunmunication through the hardware communication adapter and wherein the one or more non-privileged operations are used in sending and receiving information through the hardware communication adapter.

12. The method as recited in claim 6, wherein the dispatch module is statically linked into the kernel mode implementation module and the user mode implementation module.

13. The method as recited in claim 6, wherein the dispatch module dynamically invokes either the kernel mode implementation module or the user mode implementation module at runtime.

14. A computing system comprising a processor and a computer program product comprising one or more computer-readable media having computer-executable instructions that, when executed by the processor, implement a method for providing a single implementation of one or more operations which are common to both kernel mode processing and user mode processing relative to a hardware communication adapter, wherein the computer program product comprises:
 an interface module that identifies a common name and parameter list for one or more operations that are common to kernel mode processing and user mode processing;
 a kernel mode implementation module that implements the one or more operations for execution in kernel mode;
 a user mode implementation module that implements the one or more operations for execution in user mode, wherein the kernel mode implementation module is configured to implement more operations than the corresponding user mode implementation module, including both operations that are common between the user mode and kernel mode as well as unique operations; and
 a dispatch module that invokes the kernel mode implementation module if a calling process is a kernel mode process and invoke the user mode implementation module if the calling process is a user mode process.

15. The computing system as recited in claim 14, wherein the user mode implementation module provides direct access to the hardware communication adapter, without switching to kernel mode.

16. The computing system as recited in claim 14, wherein the program product further comprises a kernel-mode-only implementation module that implements one or more operations unique to kernel mode processing.

17. The computing system as recited in claim 16, wherein at least one of the one or more operations unique to kernel mode processing provide security parameters for the hardware communication adapter to enforce.

18. The computing system as recited in claim 14, wherein the program product further comprises an abstract hardware communication adapter module implementing generic functionality for the hardware communication adapter.

19. The computing system as recited in claim 18, wherein the kernel mode implementation module is part of a miniport module that implements hardware communication adapter specific operations for the generic functionality of the abstract hardware communication adapter module.

20. The computing system as recited in claim 14, wherein the hardware communication adapter is an InfiniBand host channel adapter.

* * * * *